(12) United States Patent
Heller et al.

(10) Patent No.: US 9,177,224 B1
(45) Date of Patent: Nov. 3, 2015

(54) OBJECT RECOGNITION AND TRACKING

(71) Applicant: Amazon Technologies, Inc., Reno, NV (US)

(72) Inventors: Geoffrey Scott Heller, Seattle, WA (US); Chang Yuan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 242 days.

(21) Appl. No.: 13/828,401

(22) Filed: Mar. 14, 2013

(51) Int. Cl.
*G06K 9/00* (2006.01)
*G06K 9/52* (2006.01)

(52) U.S. Cl.
CPC ........................................ *G06K 9/52* (2013.01)

(58) Field of Classification Search
None
See application file for complete search history.

(56) References Cited

U.S. PATENT DOCUMENTS

| 2011/0305396 A1* | 12/2011 | Lai et al. | 382/190 |
|---|---|---|---|
| 2012/0114253 A1* | 5/2012 | Nakajima | 382/201 |
| 2014/0139680 A1* | 5/2014 | Huang et al. | 348/159 |

* cited by examiner

*Primary Examiner* — Nirav G Patel
(74) *Attorney, Agent, or Firm* — Novak Druce Connolly Bove + Quigg LLP

(57) ABSTRACT

Various embodiments utilize geometric hashing to automatically recognize and track and an object. For example, a user can capture an image of a product, or other object, and a point detection algorithm can identify particular features of the product and designate feature points of the product within the captured image. Hash values are then determined for each feature point by determining a basis for the image and determining the location of each feature point relative to that basis. A hash table including the identified hash values is then created and compared to hash values for either a stored product when performing object recognition or from a reference image when performing object tracking.

20 Claims, 7 Drawing Sheets

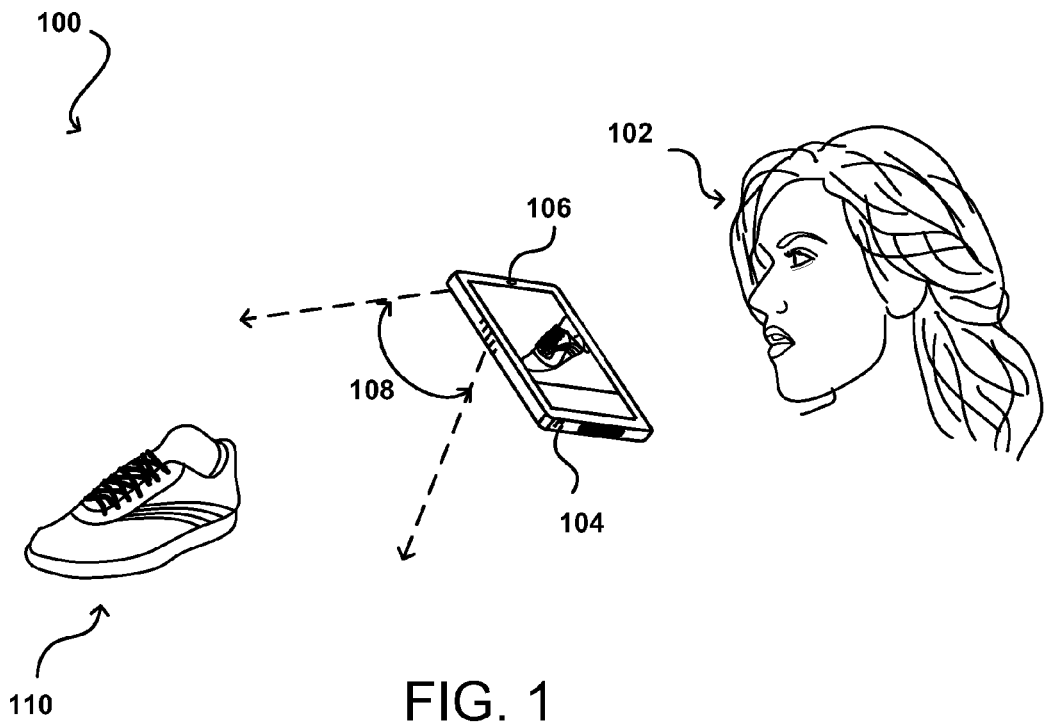
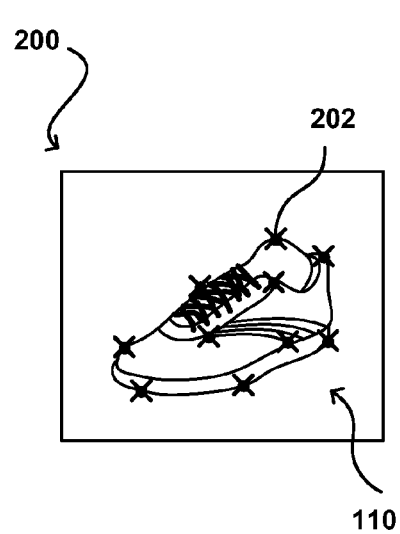
FIG. 2A
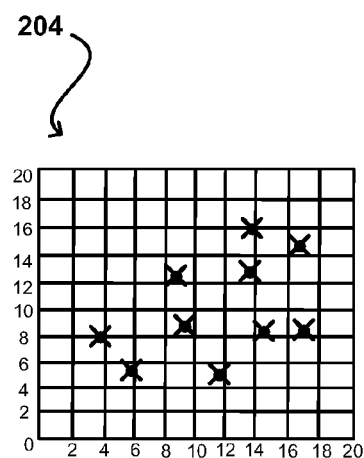
FIG. 2B

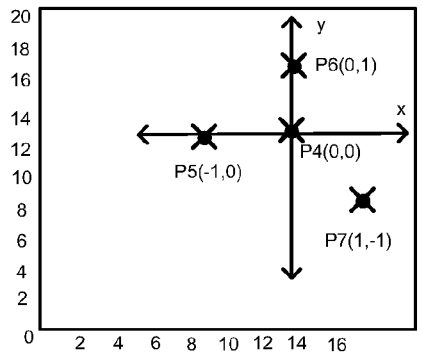
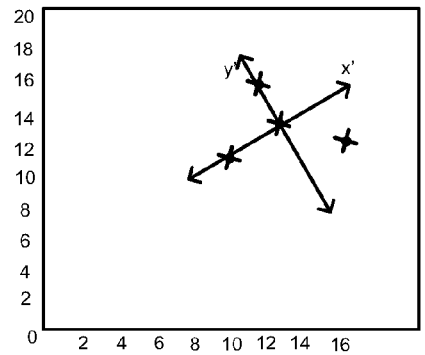
FIG. 2E  FIG. 2F
| (x',y') | Basis |
|---|---|
| P1(-1,0) | (P1,P3) |
| P2(0,0) | (P1,P3) |
| P3(1,0) | (P1,P3) |
| P4(1.75,-0.5) | (P1,P3) |
| P4(0,0) | (P5,P4) |
| P5(-1,0) | (P5,P4) |
| P6(0,1) | (P5,P4) |
| P7(1,-1) | (P5,P4) |
| P8(.75,-0.75) | (P5,P4) |
FIG. 2G

OBJECT RECOGNITION AND TRACKING

BACKGROUND

Users are increasingly utilizing electronic devices to obtain various types of information. For example, a user wanting to learn the name of a song playing in the background can cause a sample of that song to be recorded by an electronic device and uploaded to a song identification service for analysis. Similarly, a user wanting to determine the availability of a book can capture an image of the book and upload that image to a book identification service for analysis. Accordingly, automated object recognition systems to recognize and track objects in an image or multiple frames of an image are ever becoming more sophisticated. Conventional systems have utilized feature-based object tracking algorithms, such as Scale-invariant feature transform (SIFT) or Speeded Up Robust Feature (SURF) algorithm, to identify distinguishing features (which are usually corners) and calculate descriptors (unique fingerprints) for each feature point. These systems identify hundreds of feature points and their corresponding descriptors are computed for each frame in a sequence of video, for example, and a computationally intensive algorithm, such as brute force matching or Random Sample Consensus (RANSAC) algorithm, is used to track these points from frame to frame. On many electronic devices, such as mobile device, CPU and memory resources are tightly constrained, making the use of computationally expensive feature-based object tracking algorithms impractical. The most computationally demanding aspect of these algorithms is calculating the descriptors. It would, therefore, be advantageous to devise an object tracking method that obviates the need to calculate these descriptors.

BRIEF DESCRIPTION OF THE DRAWINGS

Various embodiments in accordance with the present disclosure will be described with reference to the drawings, in which:

FIG. 1 illustrates an example situation of a user using computing device to recognize an object in accordance with at least one embodiment;

FIGS. 2A-2G illustrate an process for recognizing an object with a computing device in accordance with at least one embodiment;

DETAILED DESCRIPTION

Figure 2C:
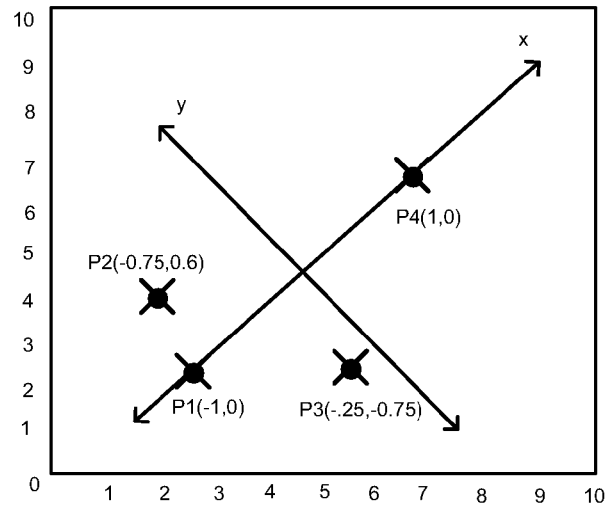

Systems and methods in accordance with various embodiments of the present disclosure may overcome one or more of the aforementioned and other deficiencies experienced in conventional approaches to recognizing an object in an image and tracking the location of the object through a sequence of images or segment of video. In particular, various approaches utilize geometric hashing to automatically recognize and track an object. For example, a user can capture an image of a product, or other object, and a point detection algorithm can identify particular features of the product and designate feature points of the product within the captured image. Subsets of the feature points are analyzed to determine, for each of the subsets, a geometric relationship with respect to a local coordinate system defined by two points of a respective subset. Each geometric relationship is then compared to reference geometric relationships stored for one or more reference objects. An object is then identified as the reference object when in response to determining that at least one of the geometric relationship of the image matches a reference geometric relationships stored for the reference object.

Feature-based object tracking algorithms work by identifying 'interesting' or 'relatively unique' (at least locally) features of an object, which typically correspond to corners, intersection points, local minima or maxima, etc., and calculating descriptors, or unique fingerprints, of the object using a feature detection algorithm, such as Scale-invariant feature transform (SIFT) or Speeded Up Robust Feature (SURF) for each feature point. Hundreds of feature points and their corresponding descriptors are computed for each frame in a video sequence and a computationally expensive algorithm, such as brute force matching or RANSAC algorithm, is used to track these points from frame to frame. On a mobile computing device, CPU and memory resources are tightly constrained, so computationally expensive feature-based object recognition or tracking algorithms are not practical. Therefore, it would be advantageous to determine a more computationally efficient approach for recognizing and tracking objects with a mobile computing device.

In one example, geometric hashing can be utilized to efficiently recognize an object in an image or track an object from a reference image where the object is represented by a discrete set of points without calculating computationally expensive descriptors. Off-line, reference objects are encoded by treating each pair of feature points as a geometric basis. As discussed herein, a basis is a set of linearly independent vectors that can represent any vector in a given vector space as a linear combination thereof. Accordingly, this set of linearly independent vectors defines a coordinate system. Therefore, each element within a vector space defined thereby can be expressed uniquely as a finite linear combination of basis vectors. The remaining points can then be represented in an invariant fashion with respect to the basis using these two parameters. In one example, each combination of four feature points is analyzed to determine their suitability as a geometric basis. Accordingly, each combination is treated as a local coordinate system defined by a first pair of the four feature points to determine a first geometric relationship defined by the relative coordinates of a second pair of the four feature points. For each point, a transformed set of coordinates or indices of the basis points are stored in a hash or geometric descriptor table. Then a new pair of basis points is selected, and the process is repeated. On-line, pairs of data points of an object are selected and considered as candidate bases in a substantially manner. For each candidate basis, the remaining data points are encoded according to the respective basis and possible matches for the object are determined. The candidate basis is determined as a match if a sufficient number of the data points index to a consistent basis of the object to within an allowable amount of deviation.

Various other functions and advantages are described and suggested below as may be provided in accordance with the various embodiments.

FIG. 1 illustrates an example situation 100 in which a user 102 is capturing one or more images of a product 110 in accordance with at least one embodiment. Using an appropriate application executing on a computing device 104, the user is able to obtain images (or video) of the product 110, which is a shoe in this example, by positioning the computing device 104 such that the shoe is within a field of view 108 of one or more cameras 106 on the computing device 104. Although a smart phone is shown, it should be understood that various other types of electronic or computing devices that are capable of determining and processing input can be used in accordance with various embodiments discussed herein. These devices can include, for example, tablet computers, notebook computers, desktop computers with a movable camera, personal data assistants, electronic book readers, video gaming controllers, and portable media players, among others. In various embodiments, the user 102 can view a live, direct or indirect, view of the product 110 and surrounding physical, real-world environment through a display screen of the computing device 104. In at least one embodiment, computer-generated sensory input, such as sound, video, overlay graphics, or GPS data, is provided over the live view, which is referred to as augmented reality (AR).

In one example, the overlay graphics are associated with item or product recognition. In this example, the computing device 104 can recognize and track an object in the live view as the user pans and/or rotates to automatically provide the user 102 with information about the object in substantially real-time. The objects can be associated with monuments, buildings, consumer products, food items, and virtually any object with a uniquely recognizable geometry. Since CPU and memory resources are tightly constrained on many mobile or portable computing devices, computationally expensive feature-based object tracking and object recognition algorithms are out of the question. The most computationally expensive components of these algorithms are, however, the calculation of an object's descriptors. While algorithms that calculate the descriptors use various properties of a feature point, such as the intensity values of neighboring pixels and the like, to create a unique fingerprint, a geometric hash, however, uses the geometric relations between points to create a fingerprint of several points, which is much less computationally expensive. Geometric hashing can, therefore, be used as a method for efficiently finding two-dimensional objects represented by discrete points.

In various embodiments, a geometric hashing method includes encoding objects in an off-line preprocessing or image preregistering phase to compute an initial transform thereof in order to provide a model or reference image to compare candidate objects in an input image against. In this example, a training model or reference image's feature points are identified. As mentioned above, each ordered pair (or basis) of the identified feature points, coordinates (a, b) are computed for the remaining features in the coordinate frame defined by each ordered pair. For example, each combination of four feature points treated as a local coordinate system defined by a first pair (basis) of the four feature points to determine a first geometric relationship defined by the relative coordinates of a second pair of the four feature points. This is referred to as quantization, which is a procedure of constraining something from a relatively large or continuous set of values, such as the real numbers, to a relatively small discrete set. In this instance, quantization refers to constraining feature points to a coordinate system based on a respective basis. After quantization, the ordered list of items ($a_q$, $b_q$) is used as an index into a geometric descriptor or hash table along with the information, such as (O, (basis)), which is an object's reference number and the basis in a corresponding geometric descriptor table bin. In one example, the values within the table can be analyzed to discard or omit values that are substantially similar each other in order to prevent processing redundancy. However, if each of a particular set of points have fairly distinct values that together represent at least one feature of an object in an image, then hash or geometric relationship values are computed and stored in the table along with the corresponding set of points.

FIGS. 2A-2G illustrate a process using geometric hashing to recognize and track the object from FIG. 1, in accordance with at least one embodiment. FIG. 2A illustrates a single input image frame 200 of the product 110. In an on-line recognition phase, points of interest are extracted from an input image. As in the off-line preprocessing phase, feature points are identified within the input image. In this example, a feature point detection algorithm, such as SURF, has highlighted a plurality of feature points 202. The feature points are defining points of an object's geometry, such as corners, inflection points, points of large intensity gradients, outline points of the object, and the like. FIG. 2B illustrates a shape space 204 that shows the feature points without the product 110 and these points can be used to calculate the geometric hashes. For each ordered pair (or basis) of the identified feature points, coordinates (x, y) are computed for the remaining features in the coordinate frame defined by each ordered pair and an arbitrary ordered pair of feature points is chosen.

At least one a pair of feature points from the input image that are substantially similar, close in distance, or ones that match too closely are eliminated, such as points that are collinear or are within a determined distance of another feature point. Therefore, only the top 20 most unique points are kept, for example. This is determined, as mentioned above, by treating each pairs of points as a geometric basis and, thus, iterating over every combination of two pairs of points (i.e. four points) to determine if a particular combination of points. If the points are all near co-linear, or are all in one small region of the image (i.e. the values are similar), then the set will be omitted from the geometric descriptor/hash table. If a particular set of points are fairly distinct and representative of at least one geometric feature of the image, then hash values are computed and added to the table. In this example, four of the feature points are selected. FIG. 2C illustrates shape space 204 with only four selected points P1-P4. All points other than P1-P4 have been removed. In this example, two of the points P1 and P4 are used to define a coordinate system, with P1 representing (−1, 0) and P2 representing (1, 0). The coordinates of the remaining feature points are computed in the coordinate system for the respective basis and inputted into a geometric descriptor/hash table. In the hash table, a record is stored which includes the particular basis pair along with an identification of the particular model or reference image at issue.

Figure 2D:
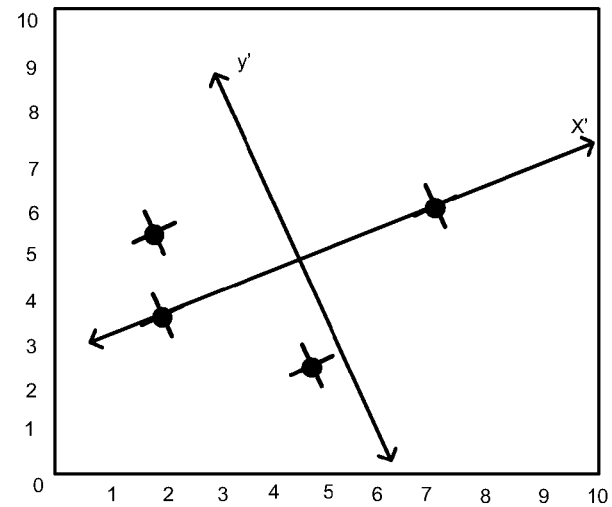

Each set of coordinates is then quantized and, for each entry in a respective geometric descriptor/hash table bin, a vote is cast for a respective bin on a comparison between the training object, or reference frame, and the respective basis pair. Accordingly, points P2 and P3 are mapped onto the coordinate system formed by P1 and P4. The geometric relationship/hash value is the corresponding (x, y)(x, y) values of the coordinates of P2 and P3 mapped onto the P1-P4 coordinate system. A histogram can be created to account for all hash table entries that received one or more votes. Table entries that receive more than a determined number of votes are deemed a potential match. For each potential match, a transformation can be determined from, for example, a best least-squares match between corresponding feature-point pairs. The features of the model or reference image are then transformed according to the determined transformation to either determine the identity of the object or track the object's movement since the reference frame. The foregoing representation allows for comparison of objects which have been rotated, translated, partially occluded, or scaled, to the feature points of the product 110. An example of a rotated set of feature points is shown in FIG. 2D. In this example, the x and y axis of the base pair P1 and P2 have been slightly rotated counterclockwise.

FIG. 2E illustrates an example of the shape space 204 where a different basis has been chosen. In this example, the points P5 and P4 are used to define the coordinate system, with P5 representing (−1, 0) and P4 representing (0, 0). The coordinates of the remaining feature points, points P6 and P7, are computed and mapped onto the coordinate system formed by P5 and P4. FIG. 2F illustrates an example rotated and scaled set of feature points that correspond to the set of hashes for FIG. 2E. In this example, the x and y axis of the base pair P5 and P4 have been slightly rotated clockwise and scaled down. FIG. 2G illustrates an example table 212 for coordinates of the feature points for the basis pairs (P1, P3) and (P5, P4).

If a sufficient match is not found, then an assumption is made that the object is no longer present in the image, and a report is generated back with a tracking failure message or the like. Otherwise, the set of points is identified to sufficiently match to within a fair degree of confidence. This can be accomplished by calculating a transformation, such as a best least-squares analysis that includes determining matches between corresponding feature point pairs. For object tracking, the feature points are can be used to compute a homography between the reference image and the current or input image. An example of a homography is a 3×3 matrix that represents a mapping between two images where a minimum of four correspondences (four pairs of corresponding points in each frame) is required for a reliable determination. Homographies are invariant to scaling, rotation and translation, which are common image transformations caused by the user moving a portable computing device, for example. The computed homography is then used, along with a bounding box of the object from the reference image, to find the bounding box of the object in the current or input image. In one example, a homography between a reference image and another image is computed by comparing their respective bounding boxes and a change in an approximate location or orientation of the object can subsequently be identified between images based at least in part on a difference between their respective geometric relationship values.

Figure 3:
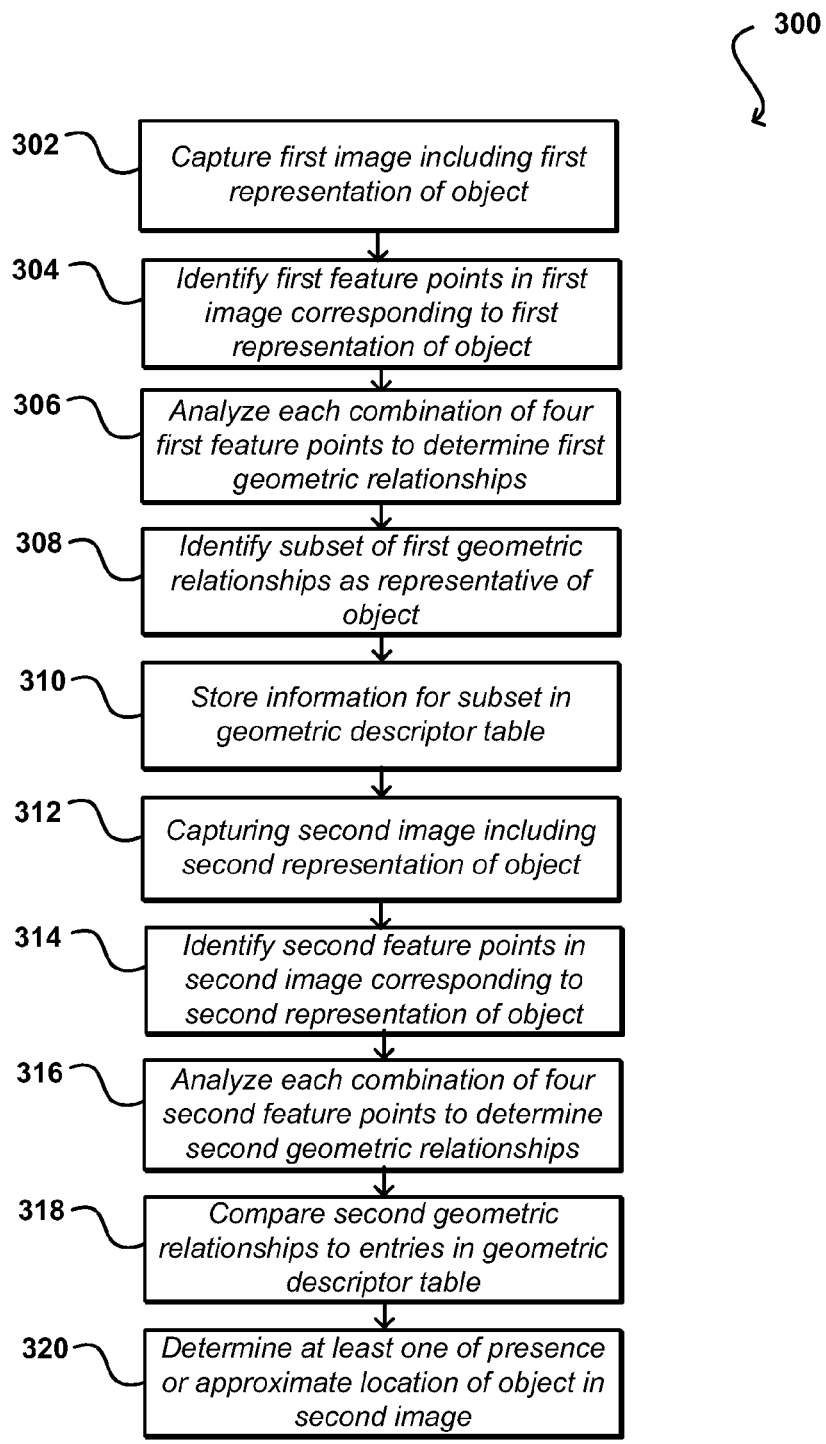
FIG. 3 illustrates an example process for tracking an object in a sequence of images that can be used in accordance with at least one embodiment.

FIG. 3 illustrates an example process 300 for tracking an object with a computing device using geometric hashing that can be used in accordance with various embodiments. It should be understood that, for any process discussed herein, there can be additional, fewer, or alternative steps performed in similar or alternative orders, or in parallel, within the scope of the various embodiments unless otherwise stated. In this example, a first image including a first representation of an object is capture with a computing device 302. An algorithm executing on the computing device may initially identify and include a set of bounding points defining a bounding box around the object that initially indicates an approximate location of the object. In this example, a plurality of feature points are identified within the reference image using a point detection algorithm 304. In this example, each combination of four feature points in the plurality of first feature points is analyzed 306. Each combination having a local coordinate system defined by a first pair of the four feature points and a first geometric relationship defined by relative coordinates of a second pair of the four feature points to the local coordinate system. In one example, the number of combinations corresponds to a number of permutations or possible iterations of all combinations of four feature points. For each combination, hash values, as discussed above, can be calculated with respect to a different coordinate system or basis. In this example, a subset of the first geometric relationships is determined to be representative of the object in the first image 308. In this example, information for the subset is stored as entries in a geometric descriptor table 310. Feature points from the table that are at least one of collinear with at least one other feature point, are within a determined distance of at least one feature point, that do not appear next to a strong corner or edge are eliminated or omitted from entry into the geometric descriptor table to prevent processing redundancy.

In this example, a second image is captured 312 and a plurality of second feature points are identified 314. In this example, each combination of four feature points in the plurality of second feature points is analyzed 316. Each of the second geometric relationships for the second image is then compared to the entries stored in the geometric descriptor table for the first image 318. In at least one embodiment, at least one of a presence or an approximate location of the object in the second image is determined 320 in response to identifying at least one second geometric relationship matching at least one entry in the geometric descriptor table to within an allowable deviation. Based at least in part on the set of bounding points and the computed homography, a set of subsequent bounding points indicating an approximate location of the object in the subsequent image can then be determined. Various other approaches can be used as well as discussed or suggested elsewhere herein.

Figure 4:
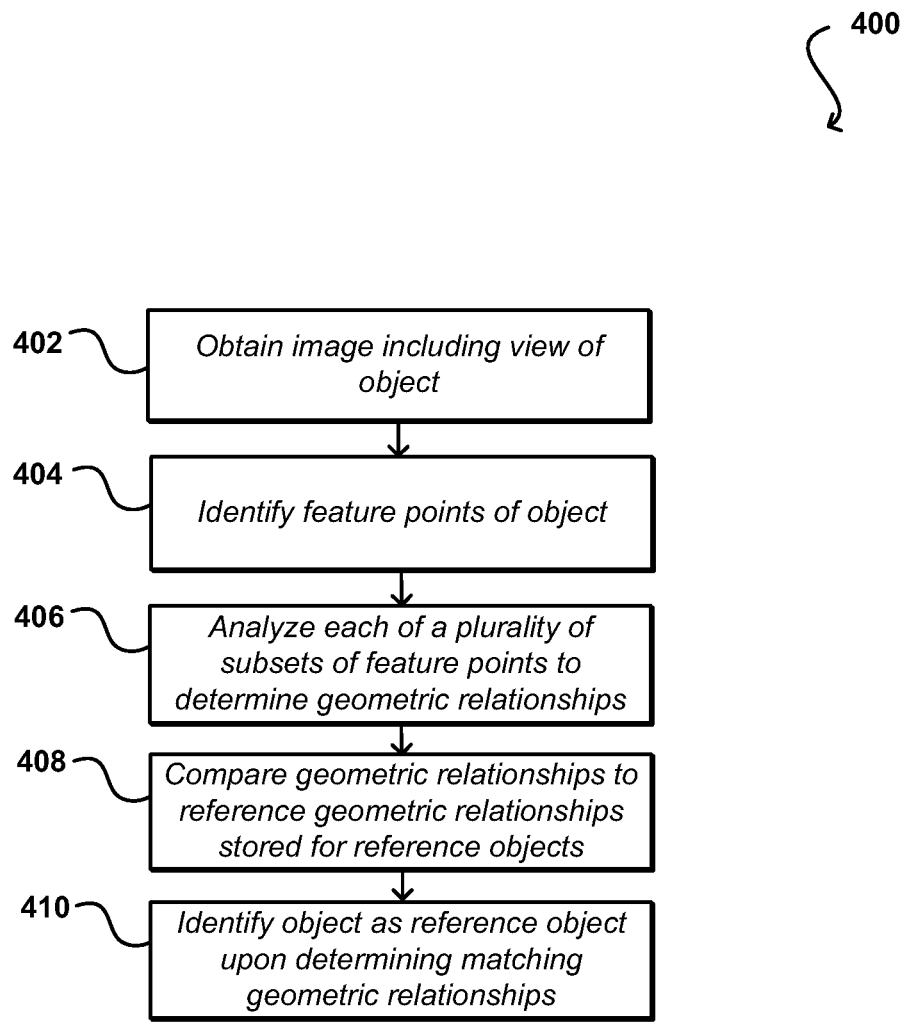
FIG. 4 illustrates an example process for recognizing an object that can be used in accordance with at least one embodiment.

FIG. 4 illustrates an example process 400 for recognizing an object with a computing device using geometric hashing that can be used in accordance with various embodiments. In this example, an image including an object to be recognized is obtained 402. Feature points of the object within the image are identified 404. Each of a number of subsets of the feature points is analyzed to determine, for each of the subsets, a geometric relationship with respect to a local coordinate system defined by two points of the subset 406. In one example, the number of subsets corresponds to a number of combinations, permutations, or possible iterations of all combinations of a determined number of feature points. Each of the geometric relationships for the image is then compared to reference geometric relationships stored for at least one reference object 408. When at least one of the geometric relationship of the image matches at least one of the reference geometric relationships stored for a reference object of the at least one reference object to within an allowable amount of deviation, the object is identified as the reference object 410. Various other approaches can be used as well as discussed or suggested elsewhere herein.

Further, computational geometry methods can be applied to refine the geometric hashing based objected recognition and tracking. For example, polygons or, more specifically, triangles can be used to create a connected graph or mesh using each of a set of three points. These triangles can be used to track particular points of a triangle as they move from frame to frame in a sequence. For example, based on relative velocities of the points, points closer to an image capture source will move faster as compared to points that are farther away. In one example, a motion estimation algorithm can be used to track these points. Motion estimation is a process of determining motion vectors from one 2D image to another.

The problem is difficult because the motion is in three dimensions but the images are a projection of the 3D scene onto a 2D plane. However, one method for tracking movement of an object includes calculating the change in lengths between particular points from frame to frame. For example, if a line between two points becoming longer in subsequent frames is indicative of an object rotating. Various other patterns are indicative of motions which can be mapped for predicting the same. In one example, the motion vectors may relate to the whole image or specific parts, such as individual triangles, arbitrary shaped patches or even per pixel. The motion vectors may be represented by a translational model, or the like, that can approximate the motion of a real video camera, such as rotation and translation in all three dimensions and zoom. In at least one embodiment, optical flow methods can also be utilized. For example, optical flow methods attempt to calculate the motion between two image frames taken at difference times at every voxel position. These methods are called differential since they are based on local Taylor series approximations of the image signal; that is, they use partial derivatives with respect to the spatial and temporal coordinates.

Figures 5A, 5B:
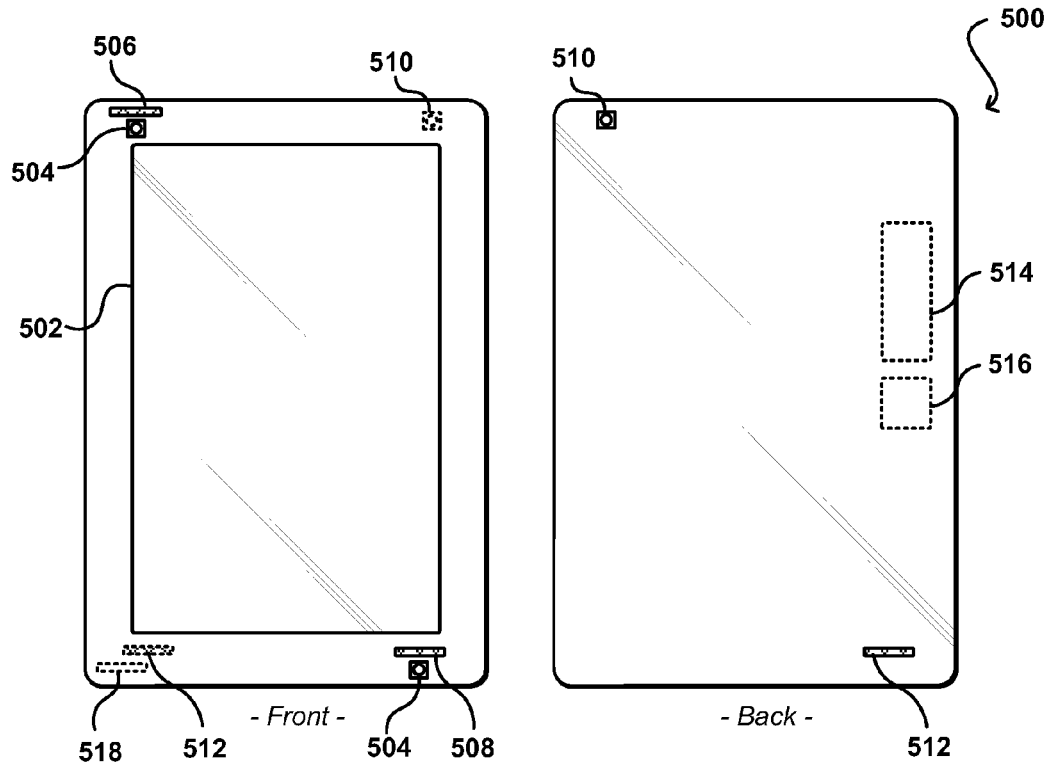
FIGS. 5A and 5B illustrate an example computing device that can be used to implement aspects of various embodiments.

FIGS. 5A and 5B illustrate front and back views, respectively, of an example electronic computing device 500 that can be used to recognize or track objects in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 504 on the front of the device and at least one image capture element 510 on the back of the device. It should be understood, however, that image capture elements could also, or alternatively, be placed on the sides or corners of the device, and that there can be any appropriate number of capture elements of similar or different types. Each image capture element 504 and 510 may be, for example, a camera, a charge-coupled device (CCD), a motion detection sensor or an infrared sensor, or other image capturing technology.

As discussed, the device can use the images (e.g., still or video) captured from the imaging elements 504 and 510 to generate an augmented reality of the surrounding environment (e.g., a virtual reality of the surrounding environment for display on the display element of the device). Further, the device can utilize outputs from at least one of the image capture elements 504 and 510 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations.

The device 500 in this example also includes one or more orientation- or position-determining elements 518 operable to provide information such as a position, direction, motion, or orientation of the device. These elements can include, for example, accelerometers, inertial sensors, electronic gyroscopes, and electronic compasses.

The example device also includes at least one communication mechanism 514, such as may include at least one wired or wireless component operable to communicate with one or more electronic devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

Figure 6:
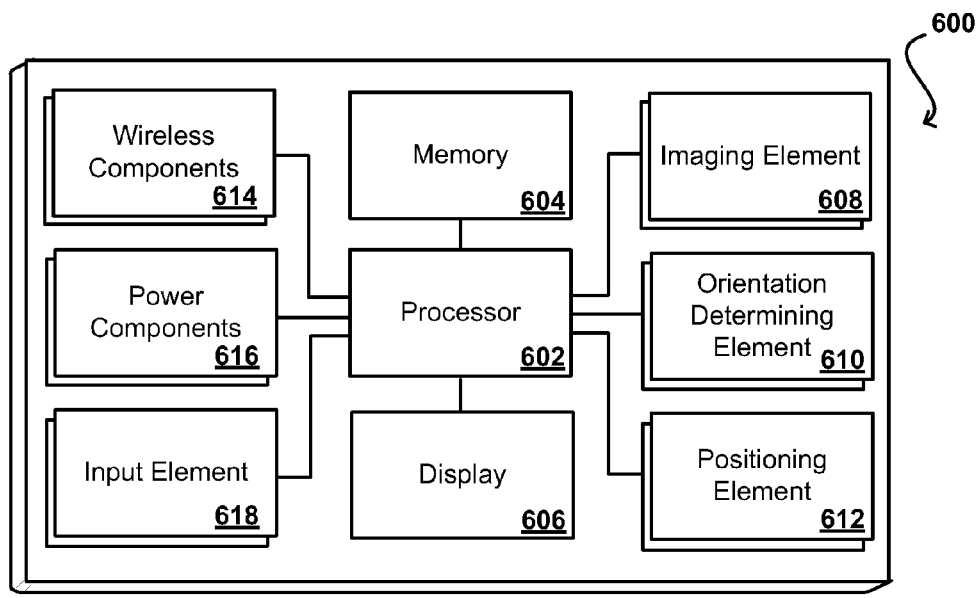
FIG. 6 illustrates example components that can be used with a device such as that illustrated in FIGS. 5A and 5B.

FIG. 6 illustrates a set of basic components of an electronic computing device 600 such as the device 500 described with respect to FIG. 5. In this example, the device includes at least one processing unit 602 for executing instructions that can be stored in a memory device or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of communication approaches can be available for sharing with other devices. The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 608, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 612 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 618 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 7:
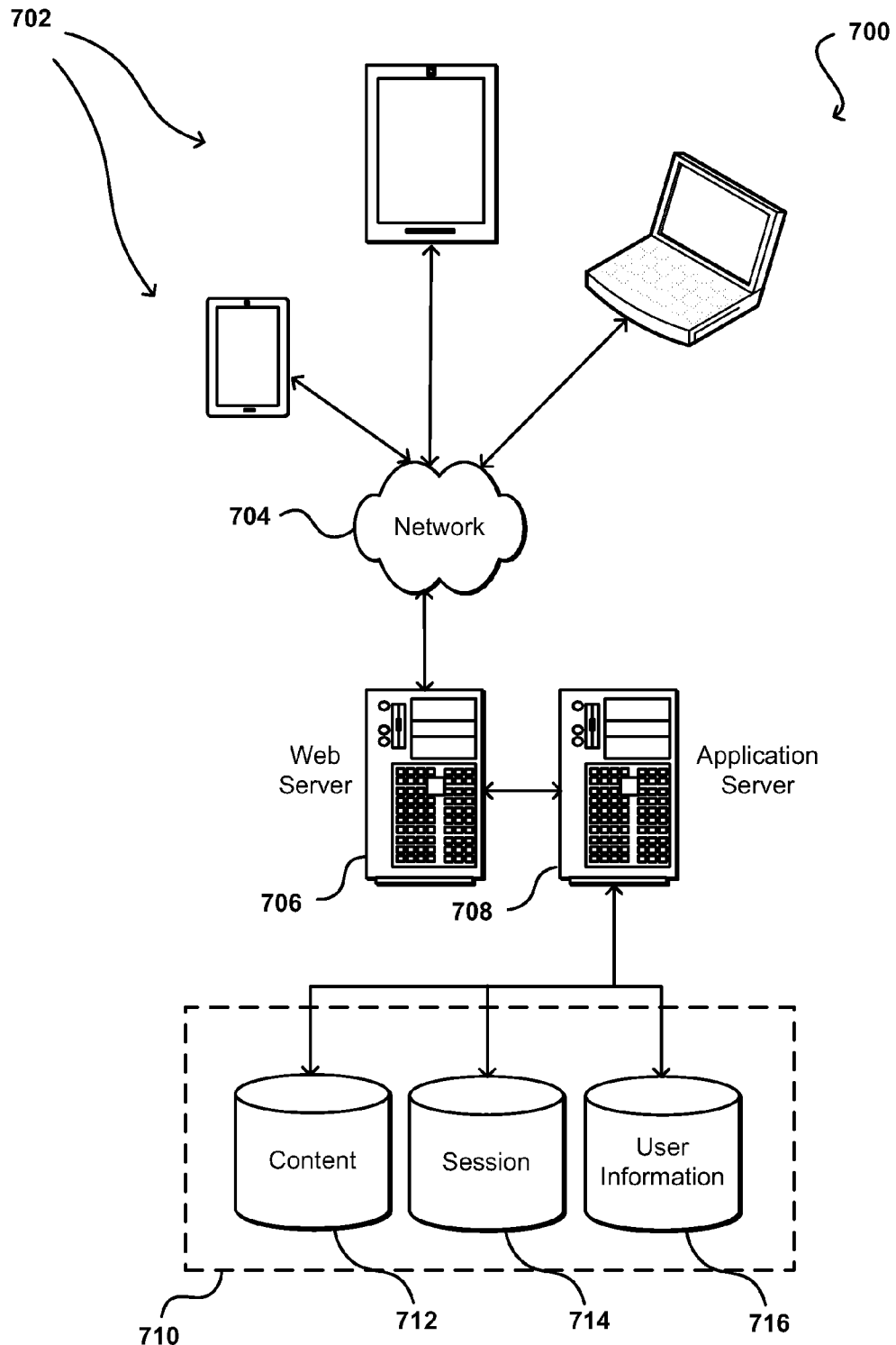
FIG. 7 illustrates an environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
under the control of one or more computer systems configured with executable instructions,
capturing, using a camera of a computing device, a first image including a first representation of an object;
identifying, in the first image, a plurality of first feature points corresponding to the first representation of the object;
analyzing, using at least one processor of the computing device, each combination of four feature points in the plurality of first feature points, each said combination having a local coordinate system defined by a first pair of the four feature points and a first geometric relationship defined by relative coordinates of a second pair of the four feature points to the local coordinate system;
identifying at least one subset of the first geometric relationships determined to be representative of the object in the first image;
storing information for the at least one subset as entries in a geometric descriptor table;
determining that a first subset of the first geometric relationships matches a second subset of the first geometric relationships;
omitting at least one of the first subset of the first geometric relationships or the second subset of the first geometric relationships from entry into the geometric descriptor table;
capturing, using the camera of the computing device, a second image including a second representation of the object;
identifying, in the second image, a plurality of second feature points corresponding to the second representation of the object;
analyzing, using the at least one processor of the computing device, each combination of four feature points in the plurality of second feature points, each said combination having a local coordinate system defined by a first pair of the four feature points and a second geometric relationship defined by relative coordinates of a second pair of the four feature points to the local coordinate system;
comparing each of the second geometric relationships for the second image to the entries stored in the geometric descriptor table for the first image; and
determining at least one of a presence or an approximate location of the object in the second image in response to identifying at least one second geometric relationship matching at least one entry in the geometric descriptor table to within an allowable deviation.

2. The computer-implemented method of claim 1, further comprising:
based at least in part on the approximate location of the object in the second image, determining at least one of a rotation or translation of the object by computing a homography between an approximate location of the object in the first image and the approximate location of the object in the second image.

3. The computer-implemented method of claim 1, wherein at least one of the plurality of first feature points corresponding to the first representation of the object or the plurality of second feature points corresponding to the second representation of the object are identified using a feature point detection algorithm.

4. A computer-implemented method, comprising:
under the control of one or more computer systems configured with executable instructions,
obtaining an image including a view of an object;
identifying a plurality of feature points of the object in the image;
analyzing each of a plurality of subsets of the feature points to determine, for each of the subsets, a geometric relationship with respect to a local coordinate system defined by two points of the subset;
comparing each geometric relationship to reference geometric relationships stored for at least one reference object;
determining that at least one of the geometric relationship of the image matches at least one of the reference geometric relationships stored for a reference object of the at least one reference object;
identifying the object as the reference object;
identifying at least one subset of the geometric relationships determined to be representative of the object in the image;
storing information for the at least one subset as entries in a geometric descriptor table;
determining that a first geometric relationship of the geometric relationships matches a second geometric relationship of the geometric relationships; and
omitting at least one of the first geometric relationship or the second geometric relationship from entry into the geometric descriptor table.

5. The computer-implemented method of claim 4, wherein the reference object is the object in a previous image in a sequence of video.

6. The computer-implemented method of claim 5, wherein the reference geometric relationships stored for the at least one reference object are calculated from a reference set of feature points of a reference image in a sequence of images including the image.

7. The computer-implemented method of claim 6, further comprising:
identifying a bounding box indicating an approximate location of the object in the image, the reference image including a reference bounding box indicating an approximate location of the object in the reference image.

8. The computer-implemented method of claim 7, further comprising:
computing a homography between the reference image and the image by comparing the bounding box in the image to the reference bounding box in the reference image; and
based at least in part on the computed homography, determining a change in at least one of an approximate location or an approximate orientation of the object between the image and the previous image based at least in part on a difference between the at least one of the geometric relationship of the image and at least one of the reference geometric relationships.

9. The computer-implemented method of claim 4, wherein the plurality of feature points are identified using a feature point detection algorithm.

10. The computer-implemented method of claim 4, wherein the reference geometric relationships stored for the at least one reference object are stored remotely on a server.

11. A computing device, comprising:
a processor;
a display screen; and
memory including instructions that, when executed by the processor, cause the computing device to:
  obtain an image including a view of an object;
  identify a plurality of feature points of the object in the image;
  analyze each of a plurality of subsets of the feature points to determine, for each of the subsets, a geometric relationship with respect to a local coordinate system defined by two points of the subset;
  compare each geometric relationship to reference geometric relationships stored for at least one reference object;
  determine that at least one of the geometric relationship of the image matches at least one of the reference geometric relationships stored for a reference object of the at least one reference object;
  identify the object as the reference object;
  identify at least one subset of the geometric relationships determined to be representative of the object in the image;
  store information for the at least one subset as entries in a geometric descriptor table;
  determine that a first geometric relationship of the geometric relationships matches a second geometric relationship of the geometric relationships; and
  omit at least one of the first geometric relationship or the second geometric relationship from entry into the geometric descriptor table.

12. The computing device of claim 11, wherein the reference object is the object in a previous image in a sequence of video.

13. The computing device of claim 12, wherein the reference geometric relationships stored for the at least one reference object are calculated from a reference set of feature points of a reference image in a sequence of images including the image.

14. The computing device of claim 13, wherein the instructions, when executed by the processor, further enable the computing device to:
  identify a bounding box indicating an approximate location of the object in the image, the reference image including a reference bounding box indicating an approximate location of the object in the reference image.

15. The computing device of claim 13, wherein the instructions, when executed by the processor, further enable the computing device to:
  compute a homography between the reference image and the image by comparing a bounding box in the image to the reference bounding box in the reference image; and
  based at least in part on the computed homography, determine a change in at least one of an approximate location or an approximate orientation of the object between the image and the previous image based at least in part on a difference between the at least one of the geometric relationship of the image and at least one of the reference geometric relationships.

16. A non-transitory computer-readable storage medium storing instructions that, when executed by at least one processor, cause a computing device to:
  obtain an image including a view of an object;
  identify a plurality of feature points of the object in the image;
  analyze each of a plurality of subsets of the feature points to determine, for each of the subsets, a geometric relationship with respect to a local coordinate system defined by two points of the subset;
  compare each geometric relationship to reference geometric relationships stored for at least one reference object;
  determine that at least one of the geometric relationship of the image matches at least one of the reference geometric relationships stored for a reference object of the at least one reference object;
  identify the object as the reference object;
  identify at least one subset of the geometric relationships determined to be representative of the object in the image;
  store information for the at least one subset as entries in a geometric descriptor table;
  determine that a first geometric relationship of the geometric relationships matches a second geometric relationship of the geometric relationships; and
  omit at least one of the first geometric relationship or the second geometric relationship from entry into the geometric descriptor table.

17. The non-transitory computer-readable storage medium of claim 16, wherein the reference object is the object in a previous image in a sequence of video.

18. The non-transitory computer-readable storage medium of claim 17, wherein the instructions that, when executed by the at least one processor of the computing device, cause the computing device to:
  compute a homography between a reference image and the image by comparing a bounding box in the image to the reference bounding box in the reference image; and
  based at least in part on the computed homography, determine a change in at least one of an approximate location or an approximate orientation of the object between the image and the previous image based at least in part on a difference between the at least one of the geometric relationship of the image and at least one of the reference geometric relationships.

19. The non-transitory computer-readable storage medium of claim 16, wherein the reference geometric relationships stored for the at least one reference object are calculated from a reference set of feature points of a reference image in a sequence of images including the image.

20. The non-transitory computer-readable storage medium of claim 16, wherein the instructions that, when executed by the at least one processor of the computing device, cause the computing device to:
  identify a bounding box indicating an approximate location of the object in the image, a reference image including a reference bounding box indicating an approximate location of the object in the reference image.

* * * * *